(12) United States Patent
Myers

(10) Patent No.: US 10,743,570 B1
(45) Date of Patent: Aug. 18, 2020

(54) BANANA FOOD

(71) Applicant: Gracienne Myers, Port Matilda, PA (US)

(72) Inventor: Gracienne Myers, Port Matilda, PA (US)

( * ) Notice: Subject to any disclaimer, the term of this patent is extended or adjusted under 35 U.S.C. 154(b) by 0 days.

(21) Appl. No.: 15/728,730

(22) Filed: Oct. 10, 2017

Related U.S. Application Data

(60) Provisional application No. 62/405,443, filed on Oct. 7, 2016.

(51) Int. Cl.
*A23L 19/00* (2016.01)

(52) U.S. Cl.
CPC ........... *A23L 19/00* (2016.08); *A23V 2002/00* (2013.01)

(58) Field of Classification Search
None
See application file for complete search history.

(56) References Cited

U.S. PATENT DOCUMENTS 4,547,263 A * 10/1985 Quame ................... C05F 11/00
162/14

5,833,757 A * 11/1998 Verhoff .................. C07G 17/00
127/42
2013/0203849 A1* 8/2013 Ben Yehuda ............ A23B 4/20
514/557

FOREIGN PATENT DOCUMENTS

WO 2014/105468 * 7/2014 ............. A23L 1/212

OTHER PUBLICATIONS

Anon, Banana Chips, Practical Action, The Schumucher Centre for Techoloy & Development, 2008, accessed at https://archive.org/details/production_banana_chips/page/n5.*
Loesecke, Bananas Chemistry Physiology Technology, Interscience Publishers, 1949.*
Palsdottir, H. Green Bananas: Good or Bad?, accessed at https://www.healthline.com/nutrition/green-bananas-good-or-bad, Healthline. com, available Sep. 2016.*
Unido Technology Manual, Small-scale Fruit and Vegetable Processing and Products, 2004 accessed at https://www.unido.org/sites/default/files/2009-05/Small_scale_fruit_and_vegetable_processing_and_products_0.pdf (UNIDO).*

* cited by examiner

*Primary Examiner* — Amber R Orlando
*Assistant Examiner* — Philip A Dubois
(74) *Attorney, Agent, or Firm* — John J. Elnitski, Jr.

(57) ABSTRACT

A mixture of green banana and ripe banana.

14 Claims, No Drawings

BANANA FOOD

This application claims the benefit of and incorporates by reference U.S. Provisional Application No. 62/405,443, filed Oct. 7, 2016.

BACKGROUND

The present invention generally relates to a banana food. More specifically, the present invention relates processed banana food.

There are many energy foods on the market. Most of these energy foods are processed with artificial ingredients and contained added sugars for a pleasing taste. The processing of the ingredients can also change the nutritional benefits of the food used. Bananas are nutritional food used by athletes to provide replacement of nutrients and energy. The consumer will eat a ripe banana as opposed to an unripen green banana due to taste, texture and digestibility that a ripe banana has over a green banana. A ripe banana will have a short shelf life of 2 to 7 days, as it deteriorates quickly after it ripens. A ripe banana is not convenient for travel as it can't fit in a pocket and bruises easily. There is also an inconsistency in flavor from banana to banana. A green banana includes nutritional and fiber benefits that are lost when the banana ripens. What is needed is a product that provides the nutritional and fiber benefits of a green banana that has a taste, texture and digestibility similar to a ripe banana. Also what is needed is a product that is shelf stable, convenient, consistent in flavor, portable and resistant to damage.

It is an object of the present invention to provide a banana product that has nutritional and fiber benefits of a green banana with a taste, texture and digestibility similar to a ripe banana.

It is an object of the present invention to provide a banana product that is shelf stable, convenient, consistent in flavor, portable and resistant to damage.

SUMMARY OF THE INVENTION

A mixture of green banana and ripe banana.

DETAILED DESCRIPTION

The present invention is a banana food in the form of an energy bar for banana consumers who need all the nutritional benefits of a ripe banana and green banana, but wants it to be shelf stable, convenient, consistent in flavor and portable. The ripe banana and green banana by themselves does not have the portability, consistency in flavor, long shelf life and all the vitamin and minerals that they would have together.

The main ingredients of the banana food are ripe bananas and green bananas. Ripe bananas typically are Yellow with brown speckles or spots. Ripe bananas are bananas that have matured and are ready for eating without process other than removal of the bark and stalk. Where the bark is commonly referred to the peel and the stalk is the top and bottom tips of the banana. Green bananas usually have a green bark. Green bananas are bananas that have not ripened or matured for harvest. Green bananas have a bitter taste and waxy texture, it contains proteins that limit your body's ability to digest complex carbohydrates if eaten raw.

The banana food is made using the following ingredients and process. Ripe bananas and green bananas are selected for processing. The ripe bananas and green bananas are cleaned by being placed in a tank with Peracetic acid and water. Peracetic acid is an organic compound with the formula $CH_3CO_3H$. The ripe bananas and green bananas are placed in separate tanks of Peracetic for ten to twenty minutes. A range of 0.1 to 0.03 of Peracetic acid per liter of water is used in the tank with ripe bananas and a range of 0.1 to 0.03 of Peracetic acid per liter of water is used in the tank of green bananas.

After cleaning the ripe bananas, the bark and stalk are removed from the ripe banana and placed in an industrial sized steam cooking pot. The ripe bananas are then cooked for about 120 minutes by stirring into a mash, this time may differ depending on the raw material available and the period of the year in which it was harvested. There is no water is added to this mixture of ripe bananas. After cleaning the green bananas, without removing the bark and stalk the green bananas are cooked in an industrial sised pressure cooker at a temperature that can range from 80° C. to 90° C. for a period of 60 minutes. After cooking, the green bananas enter the de-pulping machine, where the machine separates the bark from the fruit automatically and produces the biomass of the green banana.

While the ripe bananas are still cooking after the 120 minutes, the green bananas biomass is added to the ripe banana mixture in the proportion of 7.14% of green banana to 92.86% of ripe banana. Citric acid is also added to the mixture at about 90 grams per 300 kilos of the combined ripe bananas and green bananas. The green banana and ripe banana combination is cooked further for another 120 minutes for the mixture to reach a Brix number of at least 80%. Brix is a unit of measure used in a refractometer. When the Brix reading is divided by 2 it will be equal to the percent of crude sucrose in the plant tissue of the banana. The refractometer is a device used to measure the refractive index of plant juices in order to determine the mineral/sugar ratio of the plant cell protoplasm. Once the mixture has reached at least a Brix of 80% or more, the mixture of ripe banana and green banana is now the banana, food of the present invention. The banana food mixture is poured into trays and allowed to rest for period of 24 hours. This is so temperature of the banana food mixture reduces from about 120° C. to the ambient temperature around 23° C. to 25° C. Once the banana food mixture has reached the room temperature around 23° C. to 25° C., the trays are placed in a cold chamber an average temperature of minus 15° C. Once the banana food mixture has reached rested for 24 hours in the chamber, the banana food mixture will be of an ideal consistency to be cut at a standard size of 30 g bars to form energy bars. After cutting into the banana food mixture into energy bars, the energy bars are packaged.

The benefits of the banana food is that it provides 10 vitamins/minerals, has a 12 Month shelf life, no added sugars, is a fuel source with only 90 calories per 30 g serving size, has a delicious taste and is free of common allergens and inflammatory agents.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A method of making a solid banana food, comprising:
   removing ripe banana from bark and stalk;
   cooking the ripe banana;
   stirring the ripe banana into a mash;

adding green banana that has the bark and stalk removed to the mash of ripe banana to form a mixture, while retaining the nutritional value of the ripe banana in the mixture; and allowing 100 percent of the mixture of ripe and green banana to cool into a solid food, wherein the green banana is added so that the mixture has at least 90% ripe banana.

2. The method of claim 1, furthering including cooking the mixture of green banana and mash of ripe banana.

3. The method of claim 2, wherein the ripe banana is cooked for at least 100 minutes.

4. The method of claim 2, wherein the ripe banana is cooked for at least 100 minutes and the mixture of green banana and mash of ripe banana is further cooked for at least an additional 100 minutes.

5. The method of claim 4, further including cleaning the ripe bananas and green bananas by placing the ripe bananas and green bananas prior to removal of the stalk and bark in separate tanks with Peracetic acid and water for ten to twenty minutes.

6. The method of claim 5, wherein a range of 0.1 to 0.03 of Peracetic acid per liter of water is used in the tank with ripe bananas and a range of 0.1 to 0.03 of Peracetic acid per liter of water is used in the tank of green bananas.

7. The method of claim 2, wherein prior to mixing in the green banana, the green bananas without removing the bark and stalk are cooked in an industrial sized pressure cooker and wherein after cooking the green bananas, the green bananas enter a de-pulping machine, where the machine separates the bark from the fruit and produces the biomass of the green banana.

8. The method of claim 7, wherein the green banana is cooked at a temperature range from 80° C. to 90° C. for a period of at least 60 minutes.

9. The method of claim 8, wherein while the ripe bananas are still cooking after at least 100 minutes, the green bananas is added to the ripe banana mixture in the proportion of 7.14% of green banana to 92.86% of ripe banana, and wherein the green banana and ripe banana combination is cooked further for at least another 100 minutes for the mixture to reach a Brix number of at least 80%.

10. The method of claim 9, wherein Citric acid is added to the mixture.

11. The method of claim 9, wherein Citric acid is added to the mixture, at about 90 grams per 300 kilos of the combined ripe bananas and green bananas.

12. The method of claim 1, wherein prior to mixing in the green banana, the green bananas without removing the bark and stalk are cooked in an industrial sized pressure cooker and wherein after cooking the green bananas, the green bananas enter a de-pulping machine, where the machine separates the bark from the fruit and produces the biomass of the green banana.

13. The method of claim 1, wherein the green bananas are added to the ripe banana mixture in the proportion of 7.14% of green banana to 92.86% of ripe banana.

14. The method of claim 1, wherein the green banana and ripe banana combination is cooked for the mixture to reach a Brix number of at least 80%.

\* \* \* \* \*